F. PETERSON.
SAW.
APPLICATION FILED MAR. 29, 1912.
1,088,719.
Patented Mar. 3, 1914.
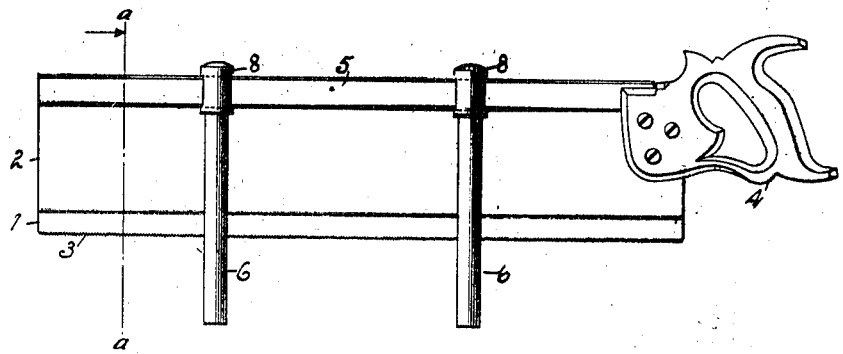
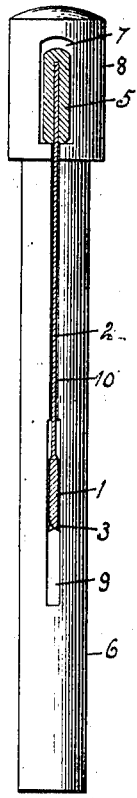
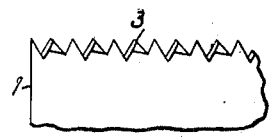

UNITED STATES PATENT OFFICE.

FRITZ PETERSON, OF ROCKFORD, ILLINOIS.

SAW.

1,088,719.    Specification of Letters Patent.    Patented Mar. 3, 1914.

Application filed March 29, 1912. Serial No. 687,252.

*To all whom it may concern:*

Be it known that I, FRITZ PETERSON, a citizen of the United States, residing at Rockford, in the county of Winnebago and State of Illinois, have invented certain new and useful Improvements in Saws, of which the following is a specification.

The object of this invention is to construct a saw without set in the teeth and which will clear itself and form a very smooth cut.

In the accompanying drawing, Figure 1 is a side elevation of my improved saw located in connection with the guides of a miter box. Fig. 2 is a section on line *a a* Fig. 1. Fig. 3 is a section of the cutting edge of the saw blade showing the ordinary filing of a cross cut saw.

The saw blade is of two thicknesses, the section 1 being thicker than the section 2. The teeth 3 are cut in the section 1, and are without set. A hand hold 4 is connected to the section 2. A back 5 is connected to the section 2.

The main feature of this invention is to provide a saw without set in order that a smooth cut may be had, this is accomplished by forming the section of the blade in which the teeth are cut thicker than the remainder of the blade.

This construction of saw is especially adapted for use in connection with miter boxes, and mitering machines, and its application is shown at Figs. 1 and 2 in which the saw guides 6 only are shown, their support in connection with the frame of the miter box or mitering machine being well known. The guides are formed with a transverse enlarged opening 7 in the head 8 and with an enlarged slot 9 extending in the length of the tubular shank of the guide 6. A narrow slot 10 in the shank connects the opening 7 and the slot 9. The saw back 5 is located in the opening 7, the section 1 of the saw blade is located in the slot 9 and the section 2 of the saw blade is located in the slot 10. The enlarged slot 9 will take the thicker section 1 of the saw blade and leave clearance for the saw dust.

By forming the saw blade without set, a smooth cut will be had, and a joint cut by my improved saw will fit perfectly without resorting to a plane.

By forming the saw with teeth without set, the saw blade can be made as hard as will allow of filing, while, when the teeth are set, the blade must be much softer to allow of the setting of the teeth without breaking off, therefore, the saw will last longer.

By forming the teeth without set, less material is removed in making a cut than when the teeth are set, thereby making this construction of saw applicable to a band saw by which more veneers may be cut from a given thickness of material.

I claim as my invention.

A back saw having a web of uniform and parallel thickness, a cutting-edge portion of greater cross-sectional thickness than that of said web, teeth on the edge of said cutting-edge portion formed without set, and the sides of said cutting-edge portion extending parallel from a point distant from said teeth, to the cutting face of said teeth.

In testimony whereof I have hereunto set my hand in presence of two subscribing witnesses.

FRITZ PETERSON.

Witnesses:
A. O. BEHEL,
E. D. E. N. BEHEL.